Patented Feb. 20, 1923.

1,445,644

UNITED STATES PATENT OFFICE.

JAMES H. REID, OF PITTSBURGH, PENNSYLVANIA, ASSIGNOR TO INTERNATIONAL NITROGEN CO., OF CLEVELAND, OHIO, A CORPORATION OF DELAWARE.

MATERIAL FOR THE PRODUCTION OF CARBIDE.

No Drawing. Application filed October 23, 1919. Serial No. 332,803.

*To all whom it may concern:*

Be it known that I, JAMES H. REID, a citizen of the United States, residing at Pittsburgh, in the county of Allegheny and State of Pennsylvania, have invented a certain new and useful Improvement in Materials for the Production of Carbide, of which the following is a full, clear, and exact description.

This invention relates to material for the production of a carbide, such as calcium carbide, and has for its general object the production of a composition from which the carbide can be produced with a very great saving of electrical energy and which will result in the production of carbide of the highest quality.

In my application No. 754,461, filed March 15, 1913 (Patent No. 1,327,736, issued January 13, 1920) there is claimed a process of producing carbide from coking coal and lime mingled in suitable proportions to form a coke-like mass and subjecting this mass to the action of heat thereby to convert it into calcium carbide, it being stated in the specification that calcium oxide or calcium carbonate may be mingled with the bituminous coal when calcium carbide is the ultimate product desired.

In my application No. 192,487, filed September 21, 1917 (Patent No. 1,396,058, issued November 8, 1921), there is claimed a process of making carbide from a cemented mixture of oxide and carbon and it is stated that this mixture may be produced by the employment of an intimate or pulverized mixture of calcium oxide with bituminous coal, heated to form a homogeneous mixture of such oxide and carbon; and it is stated that the hydrocarbons evolved from the bituminous coal initially saturate each particle of lime and are finally dissociated by the action of heat, leaving lime particles to and with which the carbon is rigidly cemented, this product being of more uniform resistance to the passage of a current of electricity than the loose mixture of calcium oxide and coke ordinarily employed.

This application is a continuation in part of the foregoing application No. 754,461 and of the patent issued in pursuance thereof.

In producing the product that is the subject matter of this application, I mix together finely divided calcium-oxygen-containing material, such as calcium oxide, but preferably calcium carbonate, with a proportion of bituminous coal such that, when the mixture is retorted, the lime constituent and the carbon will be in suitable proportions to produce calcium carbide. A satisfactory product is obtained by intimately mixing equal parts by weight of calcium carbonate ground to about 40 mesh fineness with bituminous coal ground to about 8 mesh fineness. This intimate mixture is then subjected to heat sufficient to distil the coal. The heating may be performed in an ordinary gas retort or in a furnace in which carbide is to be produced, such as shown and described in my application No. 754,461. At about 600° F. the tarry products are liberated and as the heating proceeds further, bubble through the mass of material thereabove, coating and impregnating each lime particle with hydrocarbon which, under the further influence of heat, is converted into coke or carbon. The action of the tarry products and the presence of an excess of carbon prevents the conversion of the calcium carbonate into the oxide—where the lime ingredient is the carbonate—at least as long as hydrocarbon vapors are present. At the conclusion of the operation, a cemented mass of coke and limestone is obtained which is of uniform composition throughout, each lime particle being intimately associated with and impregnated by the carbon constituent of the mass. This mass, whether the lime be in the form of the oxide or the carbonate, forms an ideal resistor to the passage of electric current in a carbide furnace, the resistance being uniform throughout and the carbide reaction being accomplished in and through the internal heat developed by the resistance of the material. Where carbonate is employed instead of the oxide, the carbide material will not deteriorate, even though exposed to the action of water. Hence it may be stored indefinitely and shipped to distant points without danger.

Furthermore, the limestone supplies not only the necessary calcium ingredient for the calcium carbide but constitutes a fluxing agent which enables the carbide reaction to be realized in a particularly efficient manner, especially in the case of electrical furnaces having a means for continuously discharging the carbide as formed.

In the furnace, the decomposition of the calcium carbonate results in the production of calcium oxide in a nascent condition and under conditions which preclude the production of any calcium hydrate.

Having thus described my invention, what I claim is:—

1. Carbide material comprising a coked mixture of a calcium-oxy-compound with cokable carbonaceous material.

2. Carbide material comprising a coked mixture of a calcium-oxy-compound with bituminous coal.

3. Carbide material comprising a coked mixture of a finely divided calcium-oxy-compound with finely divided cokable carbonaceous material.

4. Carbide material comprising calcium carbonate mingled with coke.

5. Carbide material comprising a coke-like compound produced by retorting cokable carbonaceous material with calcium carbonate.

6. Carbide material comprising a coked mixture of calcium carbonate and bituminous coal.

7. Carbide material comprising a coke-like compound produced by retorting a mixture of finely divided calcium carbonate with finely divided bituminous coal.

8. Carbide material comprising an intimate mixture of finely divided carbonate with carbon.

9. Carbide material comprising finely divided calcium carbonate, the particles of the carbonate being coated and impregnated with coke.

10. Carbide material comprising finely divided calcium carbonate, the particles of the carbonate being coated and impregnated with carbon.

11. Carbide material comprising a finely divided calcium-oxy-compound, the particles of such compound being coated and impregnated with coke.

12. Carbide material comprising a finely divided calcium-oxy-compound, the particles of such compound being coated and impregnated with carbon.

In testimony whereof, I hereunto affix my signature.

JAMES H. REID.